(12) United States Patent
Chan et al.

(10) Patent No.: US 9,788,195 B2
(45) Date of Patent: *Oct. 10, 2017

(54) MOBILE DEVICE THAT ACTIVATES UPON REMOVAL FROM STORAGE

(71) Applicant: Elwha LLC, Bellevue, WA (US)

(72) Inventors: Alistair K. Chan, Bainbridge Island, WA (US); William D. Duncan, Kirkland, WA (US); Roderick A. Hyde, Redmond, WA (US); Tony S. Pan, Bellevue, WA (US); Robert C. Petroski, Seattle, WA (US); David B. Tuckerman, Lafayette, CA (US); Lowell L. Wood, Jr., Bellevue, WA (US)

(73) Assignee: Elwha LLC, Bellevue, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/622,424

(22) Filed: Feb. 13, 2015

(65) Prior Publication Data

US 2015/0156626 A1 Jun. 4, 2015

Related U.S. Application Data

(63) Continuation of application No. 13/901,478, filed on May 23, 2013, now Pat. No. 8,971,868, and a
(Continued)

(51) Int. Cl.
*H04M 3/00* (2006.01)
*H04W 8/22* (2009.01)
(Continued)

(52) U.S. Cl.
CPC .......... *H04W 8/22* (2013.01); *H04M 1/72569* (2013.01); *H04M 2250/12* (2013.01); *H04W 4/043* (2013.01)

(58) Field of Classification Search
CPC ....... H04W 4/04; H04W 4/043; H04W 4/003; H04W 4/046; H04W 8/18–8/22;
(Continued)

(56) References Cited

U.S. PATENT DOCUMENTS 6,549,792 B1 4/2003 Cannon et al.
7,120,475 B2 10/2006 Kaneko
(Continued)

FOREIGN PATENT DOCUMENTS

KR 20040042988 A 5/2004
KR 20060114274 A 11/2006
(Continued)

OTHER PUBLICATIONS

PCT International Search Report; International App. No. PCT/US2014/038981; Sep. 30, 2014; pp. 1-3.
(Continued)

*Primary Examiner* — San Htun
(74) *Attorney, Agent, or Firm* — Foley & Lardner LLP

(57) ABSTRACT

A mobile device includes a motion sensor configured to acquire motion data, a light sensor configured to detect an ambient light level and generate light data, and a processing circuit. The processing circuit is configured to receive the motion data from the motion sensor, receive the light data from the light sensor, analyze the motion data to determine displacement data corresponding to a displacement of the mobile device, analyze the light data to detect a light transition, and analyze the displacement data and the light transition to determine whether to initiate an action.

10 Claims, 7 Drawing Sheets

Related U.S. Application Data continuation of application No. 13/972,098, filed on Aug. 21, 2013, now Pat. No. 8,971,869, which is a continuation of application No. 13/901,478, filed on May 23, 2013, now Pat. No. 8,971,868, application No. 14/622,424, which is a continuation of application No. 13/972,023, filed on Aug. 21, 2013, now Pat. No. 8,958,786, which is a continuation of application No. 13/901,478, filed on May 23, 2013, now Pat. No. 8,971,868.

(51) Int. Cl.
*H04M 1/725* (2006.01)
*H04W 4/04* (2009.01)

(58) Field of Classification Search
CPC ..... H04W 84/18; H04W 88/02–88/06; H04W 88/18; H04W 88/183; H04W 88/22; H04W 92/00; H04W 92/08; H04W 1/725; H04M 3/00
See application file for complete search history.

(56) References Cited

U.S. PATENT DOCUMENTS

| | | | |
|---|---|---|---|
| 7,145,454 | B2 | 12/2006 | Linjama et al. |
| 7,728,316 | B2 | 6/2010 | Fadell et al. |
| 2003/0162560 | A1 | 8/2003 | Kaneko |
| 2005/0164633 | A1 | 7/2005 | Linjama et al. |
| 2006/0029118 | A1 | 2/2006 | Chen |
| 2007/0004451 | A1* | 1/2007 | C. Anderson ......... G06F 1/1626 455/556.1 |
| 2007/0085157 | A1 | 4/2007 | Fadell et al. |
| 2007/0161410 | A1 | 7/2007 | Huang et al. |
| 2008/0146289 | A1 | 6/2008 | Korneluk et al. |
| 2008/0191892 | A1 | 8/2008 | Kirkup et al. |
| 2009/0197635 | A1* | 8/2009 | Kim ....................... G06F 3/0346 455/550.1 |
| 2009/0239581 | A1 | 9/2009 | Lee |
| 2009/0303184 | A1 | 12/2009 | Tao et al. |
| 2009/0309711 | A1* | 12/2009 | Adappa .................. G06Q 30/02 340/501 |
| 2010/0007638 | A1 | 1/2010 | Knowles |
| 2010/0131749 | A1 | 5/2010 | Kim et al. |
| 2010/0317332 | A1 | 12/2010 | Bathiche et al. |
| 2011/0151934 | A1 | 6/2011 | Geng |
| 2012/0252495 | A1 | 10/2012 | Moeglein et al. |
| 2013/0033485 | A1 | 2/2013 | Kollin et al. |
| 2014/0025973 | A1* | 1/2014 | Schillings ................ H04Q 9/00 713/323 |

FOREIGN PATENT DOCUMENTS

| | | |
|---|---|---|
| KR | 20060129759 A | 12/2006 |
| KR | 20090027048 A | 3/2009 |
| KR | 20090070050 A | 7/2009 |
| KR | 20090108065 A | 10/2009 |
| KR | 101098964 B1 | 12/2011 |

OTHER PUBLICATIONS

PCT International Search Report; International App. No. PCT/US2014/038990; Sep. 25, 2014; pp. 1-3.

* cited by examiner

MOBILE DEVICE THAT ACTIVATES UPON REMOVAL FROM STORAGE

CROSS-REFERENCE TO RELATED APPLICATIONS

The present application is a continuation of U.S. patent application Ser. No. 13/901,478, entitled "MOBILE DEVICE THAT ACTIVATES UPON REMOVAL FROM STORAGE," filed on May 23, 2013, which is currently co-pending. The present application is also a continuation of U.S. patent application Ser. No. 13/972,023, entitled "MOBILE DEVICE THAT ACTIVATES UPON REMOVAL FROM STORAGE," filed on Aug. 21, 2013, which is currently co-pending, which is a continuation of U.S. patent application Ser. No. 13/901,478, entitled "MOBILE DEVICE THAT ACTIVATES UPON REMOVAL FROM STORAGE," filed on May 23, 2013, which is currently co-pending. The present application is also a continuation of U.S. patent application Ser. No. 13/972,098, entitled "MOBILE DEVICE THAT ACTIVATES UPON REMOVAL FROM STORAGE," filed on Aug. 21, 2013, which is currently co-pending, which is a continuation of U.S. patent application Ser. No. 13/901,478, entitled "MOBILE DEVICE THAT ACTIVATES UPON REMOVAL FROM STORAGE," filed on May 23, 2013, which is currently co-pending. All of these applications are herein incorporated by reference in their entireties and for all purposes.

BACKGROUND

Mobile electronic devices, especially those used for communication, have become ubiquitous. Under typical circumstances, a mobile device such as a smart phone is placed in a storage location (e.g., a pocket, a purse, a bag, etc.) while not in active use, and the user must manually turn on or otherwise activate the device when he or she desires to use the device. In other scenarios, the user must manually intervene to silence a ringing mobile device, or to answer an incoming call.

SUMMARY

One exemplary embodiment relates to a mobile device including a motion sensor configured to acquire motion data, a light sensor configured to detect an ambient light level and generate light data, and a processing circuit. The processing circuit is configured to receive the motion data from the motion sensor, receive the light data from the light sensor, analyze the motion data to determine displacement data corresponding to a displacement of the mobile device, analyze the light data to detect a light transition, and analyze the displacement data and the light transition to determine whether to initiate an action.

Another exemplary embodiment relates to a method for taking action in response to a mobile device being removed from a first location. The method includes receiving motion data from a motion sensor configured to detect motion of a mobile device, receiving light data from a light sensor configured to detect an ambient light level and generate the light data, analyzing the motion data to determine displacement data corresponding to a displacement of the mobile device, analyzing the light data to detect a light transition, and analyzing the displacement data and the light transition to determine whether to initiate an action.

Another exemplary embodiment relates to a non-transitory computer-readable medium having instructions stored thereon for execution by a processing circuit. The instructions include instructions for receiving motion data from a motion sensor configured to detect motion of a mobile device, instructions for receiving light data from a light sensor configured to detect an ambient light level and generate the light data, instructions for analyzing the motion data to determine displacement data corresponding to a displacement of the mobile device, instructions for analyzing the light data to detect a light transition, and instructions for analyzing the displacement data and the light transition to determine whether to initiate an action.

Another exemplary embodiment relates to a mobile device including a light sensor configured to detect an ambient light level and generate light data, and a processing circuit configured to receive the light data from the light sensor, analyze the light data to detect a light transition, and initiate an action based on the light transition and a mode of the mobile device, wherein the mode corresponds to the mobile device being in a first location.

Another exemplary embodiment relates to a method for taking action in response to a mobile device being removed from a first location. The method includes receiving light data from a light sensor configured to detect an ambient light level and generate the light data, analyzing the light data to detect a light transition, and initiating an action based on the light transition and a mode of the mobile device, wherein the mode corresponds to the mobile device being in the first location.

Another exemplary embodiment relates to a non-transitory computer-readable medium having instructions stored thereon for execution by a processing circuit. The instructions include instructions for receiving light data from a light sensor of a mobile device, wherein the light sensor is configured to detect an ambient light level and generate the light data, instructions for analyzing the light data to detect a light transition, and instructions for initiating an action based on the light transition and a mode of the mobile device, wherein the mode corresponds to the mobile device being in the first location.

The invention is capable of other embodiments and of being carried out in various ways. Alternative exemplary embodiments relate to other features and combinations of features as may be generally recited in the claims.

The foregoing is a summary and thus by necessity contains simplifications, generalizations and omissions of detail. Consequently, those skilled in the art will appreciate that the summary is illustrative only and is not intended to be in any way limiting. Other aspects, inventive features, and advantages of the devices and/or processes described herein, as defined solely by the claims, will become apparent in the detailed description set forth herein and taken in conjunction with the accompanying drawings.

BRIEF DESCRIPTION OF THE FIGURES

The invention will become more fully understood from the following detailed description taken in conjunction with the accompanying drawings wherein like reference numerals refer to like elements, in which.

DETAILED DESCRIPTION

Figure 1:
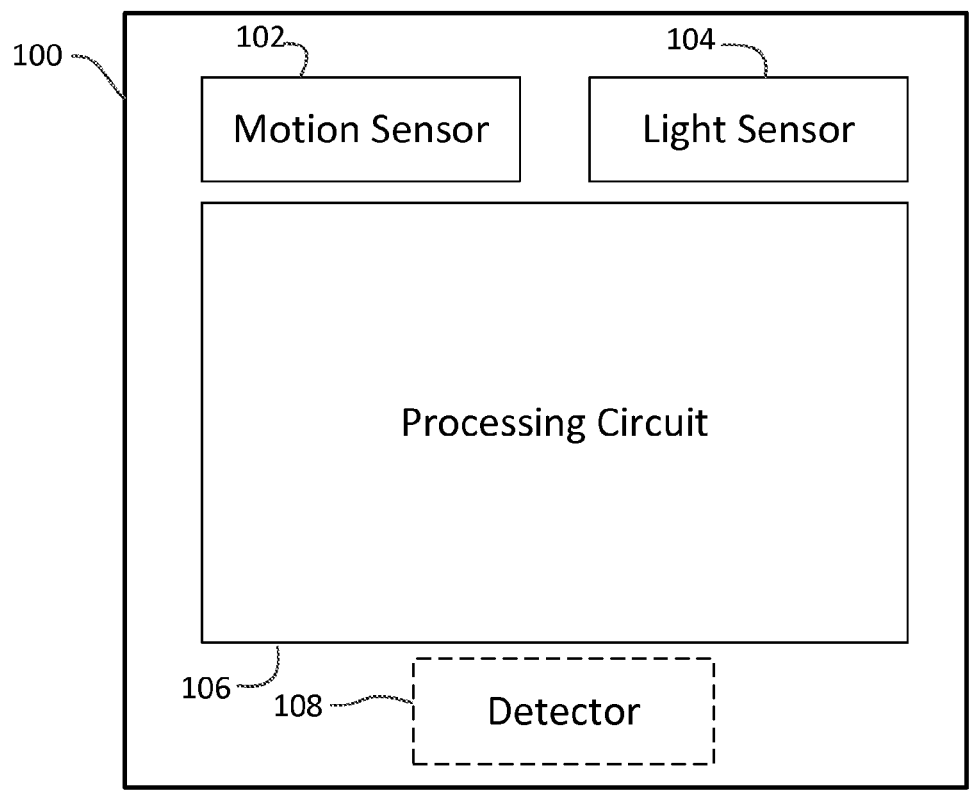
FIG. 1 is a block diagram of a mobile device, a motion sensor, a light sensor, a processing circuit, and a detector, shown according to an exemplary embodiment.

Before turning to the figures, which illustrate the exemplary embodiments in detail, it should be understood that the application is not limited to the details or methodology set forth in the description or illustrated in the figures. It should also be understood that the terminology is for the purpose of description only and should not be regarded as limiting.

Referring generally to the figures, systems and methods for a mobile device that automatically activates upon the device's removal from a first location are shown and described. A person may have their mobile device (e.g., a mobile phone, a media player with communication capabilities, a tablet computing device, etc.) placed in a first location (e.g., a pocket, a purse, a briefcase, a bag, or any other location or apparatus used to store a mobile device). In one example, the person may be in a meeting and have his or her mobile phone stored within a bag. The mobile phone receives an incoming call or invitation to initiate a communication (e.g., a video chat request, an internet protocol based voice chat request, etc.). The mobile phone begins to ring and the person reaches for and grabs the mobile phone in order to answer or to silence the ringtone. Utilizing a motion sensor (e.g., an accelerometer, or any other similar motion sensing device) and a light sensor (e.g., a photodetector, a photoresistor, a photodiode, etc.), the mobile phone automatically detects that it has been removed from the bag while ringing, and an action may be taken in to appropriately respond. It is important to note that the scope of the present disclosure is not limited to situations in which the mobile device is ringing.

In principle, one approach to automatically detect that the mobile device is being removed from the storage location would be to detect that it is being moved, for instance that it undergoes a lifting motion (e.g., vertically upwards, partially vertically upwards, a net rise, etc.). However, if the storage location is itself moving, e.g., it is a pocket of the user, a handbag carried by the user, or the like, motion of the storage location will cause motion of the mobile device, but not actually represent removal of the mobile device from the storage location. Nor does requiring the motion to be a lifting motion provide a clear discriminant, since a user could lift the storage location while standing up, while climbing stairs, or the like. Another potential discriminant is to note that the interior of a storage location is generally darker than the user's ambient environment, hence that a dark-to-light transition might be useful to indicate removal of the mobile device from the storage location. However, there are a number of common scenarios where a simple dark-to-light discriminant can prove inaccurate. For instance, the mobile device might be in a dark room when the lights are turned on, or may be carried by a user moving from a dark to light environment. Because of situations like these, it is useful to consider approaches involving both motion and light transitions, or cases involving pre-knowledge that the mobile device is in storage.

In one embodiment, the mobile device detects that it has been removed from storage by sensing and monitoring the motion of the mobile device in conjunction with sensing and monitoring ambient lighting transitions that occur while the mobile device is in motion. A processing circuit within the mobile device receives motion data from a motion-sensing device (e.g., an accelerometer, gyroscope, etc.) and uses the data to detect that the mobile device has been lifted. The processing circuit may also receive light data from a light sensor, and use the light data to detect transitions of light that correspond to the mobile device's removal from storage (e.g., a dark-to-light transition corresponding to a mobile device's removal from a pocket). By analyzing and comparing the received motion and light data, the mobile device deduces that the mobile device has been picked up by a user for use, and automatically responds to such an event.

In another embodiment, the mobile device detects that it has been removed from storage by sensing and monitoring ambient lighting transitions while the mobile device is in a pocket mode. Such a pocket mode may be an operational mode of the mobile device that that corresponds to the mobile device being within storage (e.g. a silent mode, a sleep mode, a battery-saving mode, a standby mode, etc.). The pocket mode may be actively set by a user, or automatically set by the mobile device. Mobile devices in such a pocket mode may be configured to utilize energy saving power profiles that temporarily limit power consumption of the mobile device while the device is within a pocket, bag, purse, etc. The processing circuit of the mobile device receives data from light sensors and monitors the data for dark to light transitions. In this manner, the mobile device, while operating in a pocket mode, detects that it has been removed from storage, and automatically responds to such an event.

The above described sensing and action systems may be enabled or disabled by a user as the user desires. Additionally, a user may specify thresholds in order to set certain characteristics of motion and transitions required before the device engages an automatic action. The user may also specify the actions to be taken by the mobile device. For example, exemplary actions may include automatically answering a call, stopping a ringtone, launching an application, changing a power setting, activating the mobile device, or activating a display on the mobile device, activating sensors of the mobile device, changing a mode of the device, etc. The thresholds and action specifications may be stored in a preference file. Default operating values may also be provided.

Referring to FIG. 1, a block diagram of mobile device 100 for executing the systems and methods of the present disclosure is shown. According to an exemplary embodiment, mobile device 100 includes motion sensor 102 for detecting the motion of the mobile device. Motion sensor 102 may include a single axis or multi-axis accelerometer, may contain multiple accelerometers, and may measure both linear and angular acceleration. Motion sensor 102 may contain additional components for maintaining angular references (e.g., a gyroscopic device, etc.). Mobile device 100 further includes light sensor 104 for detecting ambient light levels of the environment around mobile device 100. Light sensor 104 may include a photodetector, a photoresistor, a photodiode, a photocell, or any other means of detecting levels of light. Data collected by motion sensor 102 and by light sensor 104 are provided to processing circuit 106. Processing circuit 106 analyzes the motion data to detect when mobile device 100 is in a lifting motion. The lifting motion may be substantially vertically upwards or include a net rise. Processing circuit 106 analyzes the light data to detect transitions of light levels around mobile device 100 (e.g., a transition from a low light level to a higher light level, which may correspond to the mobile device being removed from a storage environment). Detector 108 may include a touch sensor that is configured to detect a user touching mobile device 100. Detector 108 provides touch data to processing circuit 106 and processing circuit 106 uses the touch data to activate, deactivate, or supplement the systems described herein. For example, processing circuit 106 may be configured to enable the systems described herein only when a user is actually touching mobile device 100. In this manner, processing circuit 106 may ignore motion and lighting transitions unrelated to a user picking up mobile device 100. While depicted as separate modules in FIG. 1, motion sensor 102, light sensor 104, processing circuit 106, and detector 108 may be part of one device. For example, mobile device 100 may be a mobile phone, processing circuit 106 may be the processor within the phone, and motion sensor 102, light sensor 104, and detector 108 may be a touch detection system of the mobile phone.

Figure 2:
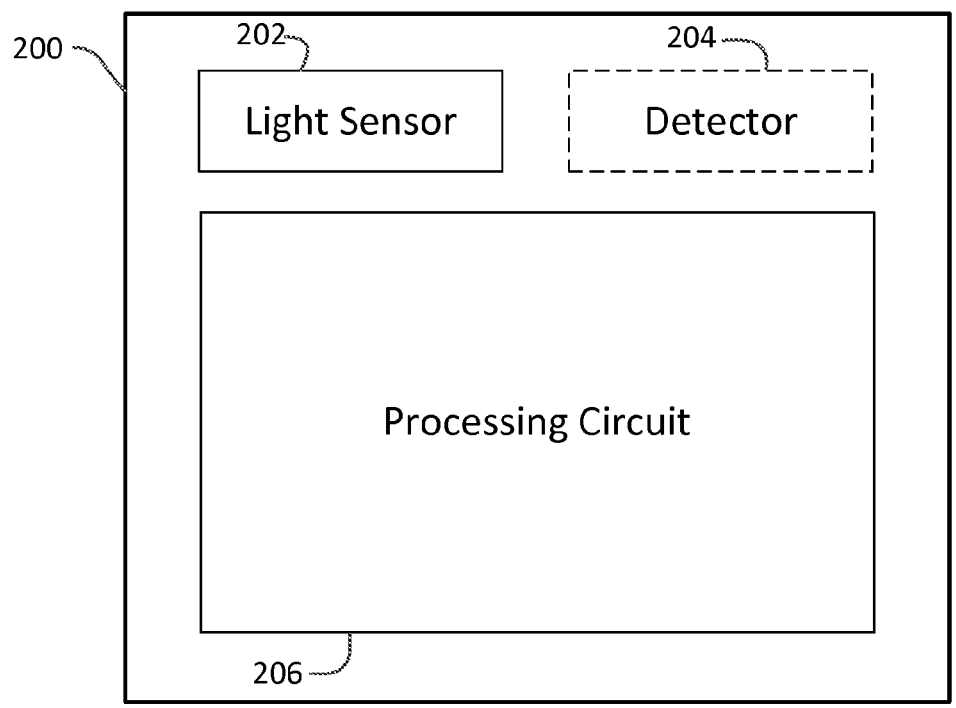
FIG. 2 is a block diagram of a mobile device, a light sensor, a processing circuit, and a detector, shown according to an exemplary embodiment.

Referring to FIG. 2, a block diagram of a mobile device 200 for executing the systems and methods of the present disclosure is shown. According to an exemplary embodiment, mobile device 200 includes light sensor 202 for detecting ambient light levels of the environment around mobile device 200. Light sensor 202 may be light sensor 104 of FIG. 1. Light sensor 202 provides light data to processing circuit 206. Processing circuit 206 analyzes the light data provided by light sensor in order to detect transitions of light around mobile device 200. Mobile device 200 may additionally include detector 204. In one embodiment, detector 204 includes an ultrasonic transducer configured to generate probe signals and detect probe signal reflections. In another embodiment, detector 204 includes a microphone configured to detect attenuation of one or more frequency components of ambient sound. In another embodiment, detector 204 includes a thermal sensor configured to detect the temperature of the environment around mobile device 200. Processing circuit 206 may use data provided by detector 204 to determine when mobile device 200 is confined within storage, or to adjust a mode of mobile device 200. In one embodiment, processing circuit 206 uses temperature data provided by a thermal sensor detector 204 (e.g., temperature data corresponding to the body heat of a user) to determine when mobile device 200 is within a user's pocket based on a temperature profile. Processing circuit may also use the detector 204 data during its analysis of light information provided by light sensor 202. While depicted as separate modules in FIG. 2, light sensor 202, detector 204, and processing circuit 206 may be part of one device. As an example, mobile device 200 may be a cellular phone (or a handheld mobile device), processing circuit 206 may be the processor within the phone, and light sensor 202 and detector 204 may be a sensor (or sensors) coupled to the cellular phone.

Figure 3:
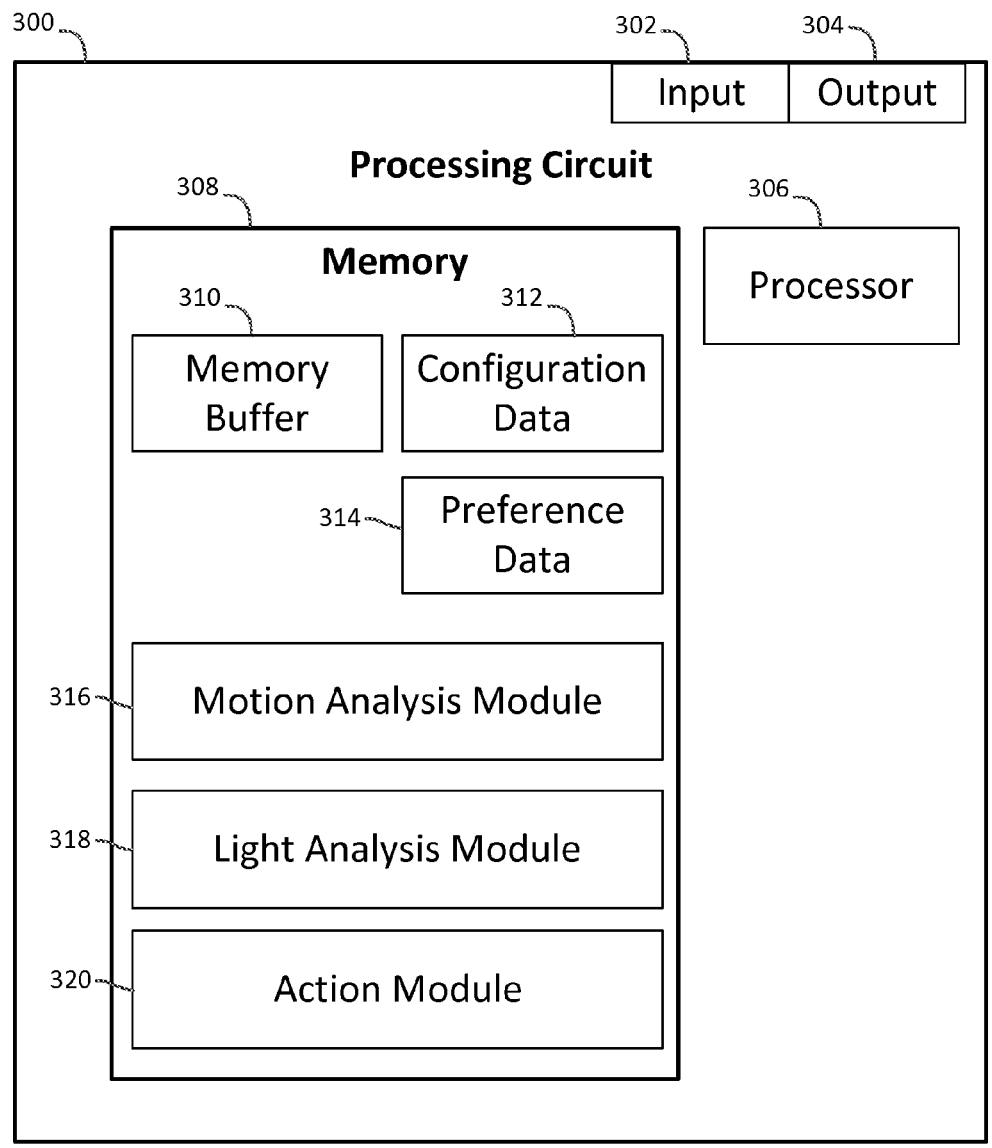
FIG. 3 is a detailed block diagram of a processing circuit, shown according to an exemplary embodiment.

Referring to FIG. 3, a more detailed block diagram of processing circuit 300 for completing the systems and methods of the present disclosure is shown according to an exemplary embodiment. Processing circuit 300 may be processing circuit 106 of FIG. 1 or processing circuit 206 of FIG. 2, etc. Processing circuit 300 is generally configured to accept input from an outside source (e.g., a motion sensor, a light sensor, etc.). Processing circuit 300 is further configured to receive configuration and preference data. Input data may be accepted continuously or periodically. Processing circuit 300 uses the input data to analyze the motion of a mobile device, to analyze lighting levels of the environment around the mobile device, and to determine if a user is lifting the mobile device from storage. Processing circuit 300 determines if automatic action will be taken in response to such an event, and processing circuit 300 controls such action.

According to an exemplary embodiment, processing circuit 300 includes processor 306. Processor 306 may be implemented as a general-purpose processor, an application specific integrated circuit (ASIC), one or more field programmable gate arrays (FPGAs), a group of processing components, or other suitable electronic processing components. Processing circuit 300 also includes memory 308. Memory 308 is one or more devices (e.g., RAM, ROM, Flash Memory, hard disk storage, etc.) for storing data and/or computer code for facilitating the various processes described herein. Memory 308 may be or include non-transient volatile memory or non-volatile memory. Memory 308 may include database components, object code components, script components, or any other type of information structure for supporting the various activities and information structures described herein. Memory 308 may be communicably connected to the processor 306 and include computer code or instructions for executing the processes described herein (e.g., the processes shown in FIGS. 5-8).

Memory 308 includes memory buffer 310. Memory buffer 310 is configured to receive data from a sensor (e.g. motion sensor 102, light sensor 104, detector 108, etc.) through input 302. For example, the data may include motion information, acceleration information, light detection information, sonic or ultrasonic information, touch information, thermal information, and mobile device mode information. The data received through input 302 may be stored in memory buffer 310 until memory buffer 310 is accessed for data by the various modules of memory 308. For example, motion analysis module 316, light analysis module 318, and action module 320 may each access the data that is stored in memory buffer 310.

Memory 308 further includes configuration data 312. Configuration data 312 includes data relating to processing circuit 300. For example, configuration data 312 may include information relating to interfacing with other components of a mobile device. This may include the command set needed to interface with graphic display components, for example, a graphics processing unit (GPU). As another example, configuration data 312 may include information as to how often input should be accepted from a motion sensor, how often lighting information should be accepted from a light sensor, and how often input should be accepted from a detector. Configuration data 312 further includes data to configure the communications between the various components of processing circuit 300.

Memory 308 further includes modules 316, 318, and 320 for executing the systems and methods described herein. Modules 316, 318, and 320 are configured to receive motion information, lighting information, sensor information, radar information, sonic or ultrasonic information, mobile device mode information, preference data, and other data as provided by processing circuit 300. Modules 316, 318, and 320 are generally configured to analyze the data, determine if a user is removing the mobile device from storage, and determine whether to take action in response to such motion. Exemplary actions include answering an incoming call, connecting an incoming video chat request, activating the display of the mobile device, launching an application, adjusting a volume setting of the mobile device, changing a power usage setting on the mobile device, activating a sensor of the mobile device, or otherwise changing an operational mode of the mobile device.

Figure 4:
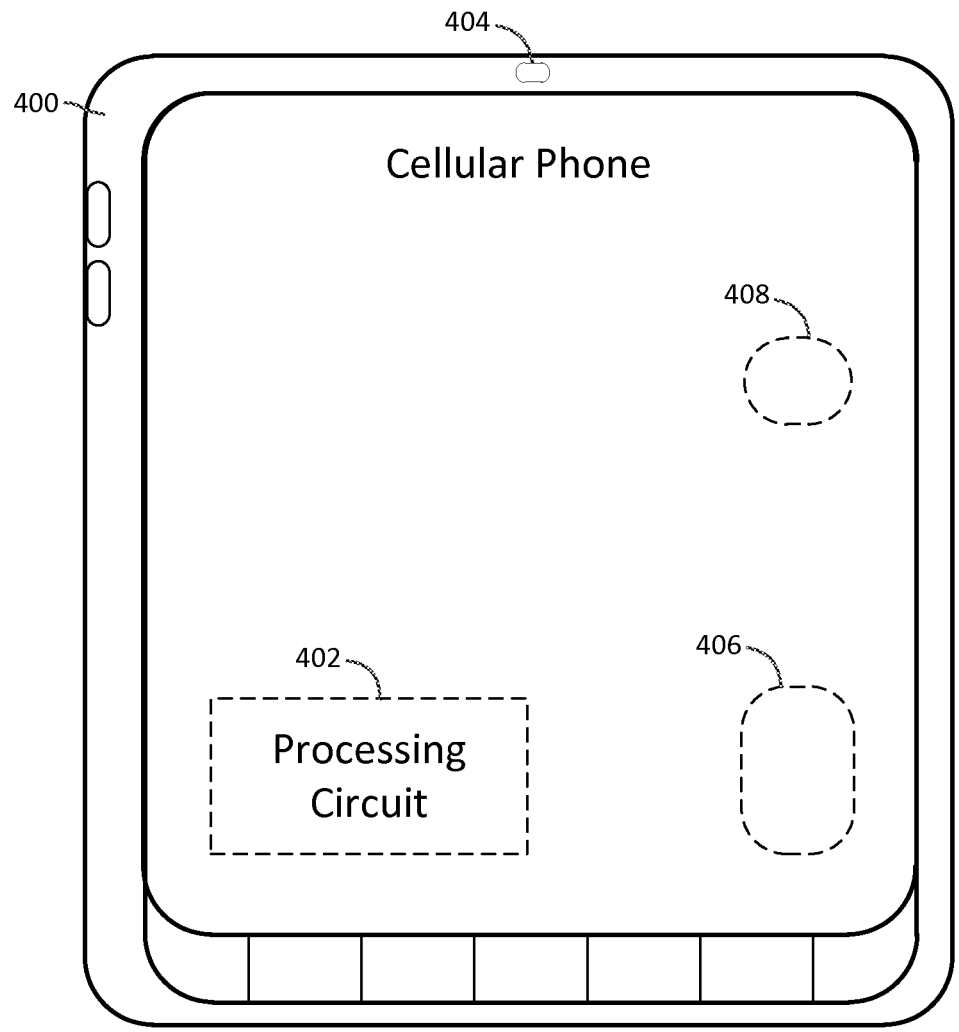
FIG. 4 is a schematic diagram of a mobile device, a processing circuit, a light sensor, a motion sensor, and a detector, shown according to an exemplary embodiment.

Motion analysis module 316 is configured to receive motion data from a motion sensor (e.g., motion sensor 102 of FIG. 1, motion sensor 406 of FIG. 4, etc.). The motion data corresponds to motion related to movement of a mobile device. For example, the data may correspond to motion that occurs when a mobile device is picked up by a user. The motion data may be provided through input 302 or through memory buffer 308. Motion analysis module 316 scans the motion data and analyzes the data. Motion analysis module 316 determines whether the motion data is associated with that of a mobile device being removed from storage. This may be achieved through motion analysis algorithms. Such algorithms determine displacement information (e.g., via double integration of acceleration data, etc.). The displacement information may be further processed to determine if a sufficient lifting motion has occurred. Motion thresholds are also provided by configuration data 312, or by user settings stored within preference data 314. For example, a user may have a certain threshold that he or she requires to be met in order for motion analysis module 316 to consider the motion a valid "lifting" motion. In one embodiment the threshold is a timing requirement. For example, motion analysis module 316 may require the mobile device to be displaced a certain distance within a certain time span/interval. In this manner, the lifting motion must occur sufficiently rapidly, and gradual motions may be eliminated from triggering an action. In another embodiment, the threshold is a distance requirement. For example, the threshold may specify that in order for a motion to be further processed, the motion must at least consist of a displacement of a certain distance. In this manner, short distance motions may be eliminated from triggering an action. In another embodiment, motion analysis module 316 requires that a motion be substantially vertical in overall displacement. In another embodiment, motion analysis module 316, may acceptably trigger in a situation where a dark-to-light transition is accompanied by horizontal motion, but is then quickly followed by lifting motion (e.g., a sitting user first removes a phone from his pocket, and then lifts it towards his face). It should be understood that a wide range of threshold values and user settings are envisioned, and the scope of the present application is not limited to any specific thresholds. When motion analysis module 316 detects an appropriate motion, action module 320 is notified and provided data related to the motion.

In another embodiment, motion analysis module 316 compares motion data to typical motion profiles associated with the removal of a mobile device from storage. Motion profiles include distance, velocity, and acceleration characteristics. Initial motion profiles may be stored and provided by configuration data 312. Additionally, motion analysis module 316 may make use of machine learning, artificial intelligence, interactions with databases and database table lookups, pattern recognition and logging, intelligent control, neural networks, fuzzy logic, etc. In this manner, motion analysis module 316 may store and update motion profiles in order to tailor them for a particular user.

In another embodiment, motion analysis module 316 causes a light sensor to activate (e.g., light sensor 104 of FIG. 1, light sensor 404 of FIG. 4, etc.). For example, a sufficient lifting motion may be required before a light sensor is activated and light data input is accepted. In this manner, analysis of light data by light analysis module 318 will only initiate if an appropriate lifting motion is first detected. This can be useful in conserving battery life and processing power of the mobile device, as additional light processing will only occur as needed.

Light analysis module 318 is configured to receive light data from a light sensor (e.g., light sensor 104 of FIG. 1, light sensor 202 of FIG. 2, light sensor 404 of FIG. 4, etc.). The light data may be provided through input 302 or through memory buffer 308. The light data corresponds to levels of ambient light around a mobile device. Light analysis module 318 scans the light data and analyzes the data. Light analysis module 318 determines whether a transition of light has occurred, and characterizes any detected transitions of light. For example, light analysis module 318 may monitor the data for dark to light transitions of light. Typically, when a mobile device is within storage (e.g., within a purse or a pocket, etc.), the ambient light levels around the mobile device will be lower than levels of light as when the mobile device is removed from storage (e.g., held to a user's ear, placed on a table, etc.). Light transitions may be compared to threshold data. Light transition thresholds may be provided by default values that are stored within configuration data 312, or by user settings stored within preference data 314. For example, a user may have a certain threshold (e.g., a brightness level) that he or she requires to be met in order for light analysis module 318 to characterize the transition as corresponding to the removal of the mobile device from storage. For example, the threshold may correspond to a ratio of the light to dark intensity levels (e.g., ratios of 1.2:1, of 2:1, of 5:1, or of 10:1, etc.). When light analysis module 318 detects an appropriate transition, action module 320 is notified and provided data related to the transition.

In one embodiment, light analysis module 318 analyzes the light data to identify color transitions corresponding to the light data. Light analysis module 318 may monitor a color, a range of colors, a wavelength, or a range of wavelengths, and supplement its determination of a light transition with such monitoring. For example, light analysis module 318 may monitor color temperatures of visible light typically associated with indoor lighting. In one embodiment, light analysis module 318 monitors color temperatures between 2700K-2900K, typically associated with 60-watt incandescent bulbs. In another embodiment, light analysis module 318 monitors color temperatures between 3000K-3500K, typically associated with fluorescent bulbs. In one embodiment, light analysis module 318 monitors wavelengths from 390 nm to 700 nm, which are generally detectable as visible light by the average human eye. Light analysis module 318 may apply averaging or integration algorithms to the monitored colors or wavelengths in determining whether a color change occurred that is associated with a light transition. In this manner, the monitored colors or wavelengths within the current field of view may be averaged, and the average value you may be monitored for transitions.

In one embodiment, light analysis module 318 utilizes scene recognition algorithms to supplement a determination that a light transition has occurred. For example, light analysis module 318 may apply object recognition techniques to a captured scene. This may include detecting boundaries of objects and monitoring the areas within the boundaries. In this manner, light analysis module 318 may compare the area (e.g., average colors within the area, boundary dimensions, etc.) corresponding to an object of a first scene with the same area as applied to a second scene. If the object data or boundaries are altered from the first scene to the second scene, light analysis module 318 may determine with greater reliability that a light transition has occurred. Frameworks such as the Viola-Jones object detection framework, the OpenCV (Open Source Computer Vision) library, etc., may be used in the scene and object detection algorithms of light analysis module 318.

In one embodiment, light analysis module 318 bases light transition thresholds on external conditions of the environment around the mobile device. For example, light transition thresholds may be based on the current location of the mobile device. This may be achieved through use of GPS systems typically found within mobile devices, cellular-based positioning systems, or internet-based positioning systems. Data related to the location of the mobile device may be provided through input 302 to light analysis module 318. In this manner, light analysis module may adjust thresholds according to an estimate as to whether the device is indoors or outdoors, etc. As another example, light transition thresholds may be based on the time of day. Time data may be provided through input 302 to light analysis module 318, which may use the data to adjust threshold values (e.g., during the night, a smaller transition between dark to light may be required for action, and during the day, an increased transition between dark to light may be required for action, etc.). As another example, light transition thresholds may be based on weather conditions. Weather data may be provided through input 302 to light analysis module 318. Light analysis module may adjust threshold values according to cloud cover or daylight conditions, etc.

In one embodiment, light analysis module 318 causes a motion sensor to activate (e.g., motion sensor 102 of FIG. 1, motion sensor 406 of FIG. 4, etc.). For example, a sufficient light transition may be required before input from a motion sensor is accepted. In this manner, motion analysis module 316 only analyzes motion data if an appropriate light transition is first detected. This can be useful in conserving battery life and processing power of the mobile device, as additional motion processing will only occur as needed.

Action module 320 is configured to accept processed motion and light data from motion analysis module 316 and light analysis module 318, respectively. Action module 320 receives the processed data and determines if an action will be taken in response to the received data. For example, if received motion data indicates a lifting motion, and the light data indicates that a dark to light transition has occurred during the lifting motion, action module 320 may deduce that the mobile device has been removed from storage (or is in the process of being removed from storage) and may initiate an action. Action module 320 may require a combination of a lifting motion and a light transition in order to initiate an action. Action module 320 may impose selected simultaneity requirements for lifting motion and light transitions; they may be required to be performed concurrently, may be required to occur within 1 second, within 3 seconds, within 10 seconds, or within other selected time intervals. The order of a lifting motion and a light transition may be unspecified, or one may be required to precede the other. Action requirements can be based on user settings or default configuration settings. For example, in one configuration, action module 320 requires both a lifting motion and a light transition for an automatic action during daytime hours, but only requires a lifting motion for an automatic action during nighttime hours. Such configuration settings as discussed within the present disclosure may be adjusted via a graphical user interface typically provided by a mobile device.

Actions initiated by action module 320 may also be based on the current state of the mobile device. In one embodiment, the mobile device is a mobile phone, and action module 320 causes the mobile phone to automatically connect to an incoming call as the user is removing his or her mobile phone from storage to answer the call. In another embodiment, the mobile device is a mobile phone, and action module 320 causes the mobile phone to automatically silence the ringing of an incoming call as the user is removing his or her mobile phone from storage to answer the call. Actions may be specified by default settings stored in configuration data 312, or may be specified by a user and stored in preference data 314. A wide variety of actions are envisioned by the scope of the present application. Actions include, but are not limited to, activating a display, unlocking the mobile device, activating a home screen on the display, changing a power usage setting of the mobile device, activating a sensor of the mobile device, launching a specific application on the mobile device, adjusting a volume setting, adjusting a display brightness setting, or otherwise changing an operational mode of the device. Actions are not limited to a single action. For example, an action may include both the launching of a specific application and the changing of a power usage setting. Similar to as discussed above, thresholds may also limit the initiation of actions. For example, a light transition may be required to occur within a certain distance of a lifting motion in order for an action to be initiated. In one embodiment, a threshold requires a light transition to occur within the first 10 inches of motion. If this threshold is met, action module 320 determines that the mobile device has been removed from storage and proceeds to initiate action, otherwise, action module 320 may ignore the motion and transition.

In some embodiments, action module 320 receives additional data from a detector (e.g., detector 108 of FIG. 1, detector 204 of FIG. 2, detector 408 of FIG. 4, etc.). Multiple detectors may be present within a mobile device. Action module 320 may use detector data to supplement its action determination process. In one embodiment, the detector may be a touch sensor (e.g., capacitive sensor system, etc.). Action module 320 may accept touch data and only perform analysis of motion and light data while the mobile device is actively being touched by a user. In another embodiment, action module 320 may use the touch data to confirm a determination to initiate action as described above. In another embodiment, the detector may include an audio sensor (e.g., an ultrasonic transducer, etc.). Probe audio signals may be generated and signal reflections may be detected by the detector. Audio reflection data may be provided to action module 320 and processed to confirm or deny that the mobile device is within a storage location. For example, if the audio reflection data indicates that reflections of the probe signals are received within a certain time frame, action module 320 may deduce that the device is currently within storage (e.g., within a back or pocket). This information may be used as a requirement for action as discussed above. In another embodiment, the detector may include a microphone configured to ambient sound. Ambient sound data may be processed to detect attenuation of sound. This data may be provided to action module 320 to determine whether the mobile device is within storage. For example, if the ambient sound data indicates that there is significant attenuation of sound, action module 320 may deduce the device is currently within a pocket. In another embodiment, the detector may include a thermal sensor configured to detect ambient heat or temperature. Heat data may be provided to action module 320 and processed to confirm that the mobile device is within storage. For example, if heat data indicates a certain temperature range, action module 320 may deduce the device is currently within storage (e.g., within a pocket near the body heat of a user).

In some embodiments, motion sensors may be bypassed, disabled, or not present within the mobile device (e.g., mobile device 200 of FIG. 2). In such embodiments, action module 320 may base a determination to initiate action on processed light data and a current mode of the mobile device. Supplemental detector data may also be utilized as discussed above. For example, a mobile device may be operating in a mode that corresponds to being within storage (e.g., a pocket mode, a sleep mode, a standby mode, etc.). Such a mode may be initiated by a user or otherwise by the operating system of the mobile device. Action module 320 receives mode information via input 302. Action module 320 may require the mobile device to be in a storage mode prior to analyzing light data provided by light module 318. Alternatively, action module 320 may analyze light data and use the received mode data to confirm an initiation of action. For example, using received mode data, action module 320 may determine that the mobile device is in a pocket mode, and then proceed to initiate an action after an appropriate light transition has been detected. If the same mobile device is not operating in a pocket mode, action module 320 will not initiate an action in response to same light transition.

Processing circuit 300 further includes output 304 configured to provide an output to an electronic display, or other components within a mobile device. Outputs may include commands, preference file information, and other information related to initiating an action as described above. Outputs may be in a format required to instantiate an action on the mobile device, and may be defined by requirements of a particular mobile operating system. In one example, output includes parameters required to launch an application. In another example, output may includes a command to cause the mobile device to connect an incoming call. In another example, output includes a command to silence a ringtone.

Referring to FIG. 4, a schematic diagram of mobile device 400, processing circuit 402, light sensor 404, motion sensor 406, and detector 408 are shown according to an exemplary embodiment. Mobile device 400 is depicted as a mobile phone. Processing circuit 402 is shown as internal processing components of the mobile phone. Processing circuit 402 contains modules and components as described above (e.g., modules as discussed for processing circuit 300 of FIG. 3). Light sensor 404 is shown as coupled to the mobile phone. Motion sensor 406 is shown as an internal accelerometer device. Detector 408 is shown as an internal detector device, and may be a detector as described above. It should be understood, that the scope of the present application is not limited to a particular arrangement of sensors or detectors.

In an exemplary embodiment, mobile device 400 is a tablet computing device that is capable of video conferencing. Sensor 404 is an ambient light sensor coupled to the tablet computer. Sensor 404 may be a component of a camera module of the tablet computing device. Processing circuit 402 is the processing circuit of the tablet computer that is configured to implement the systems and methods described herein. Motion sensor 406 is as an internal accelerometer device. Detector 408 is as an ultrasonic audio device as described above.

Figure 5:
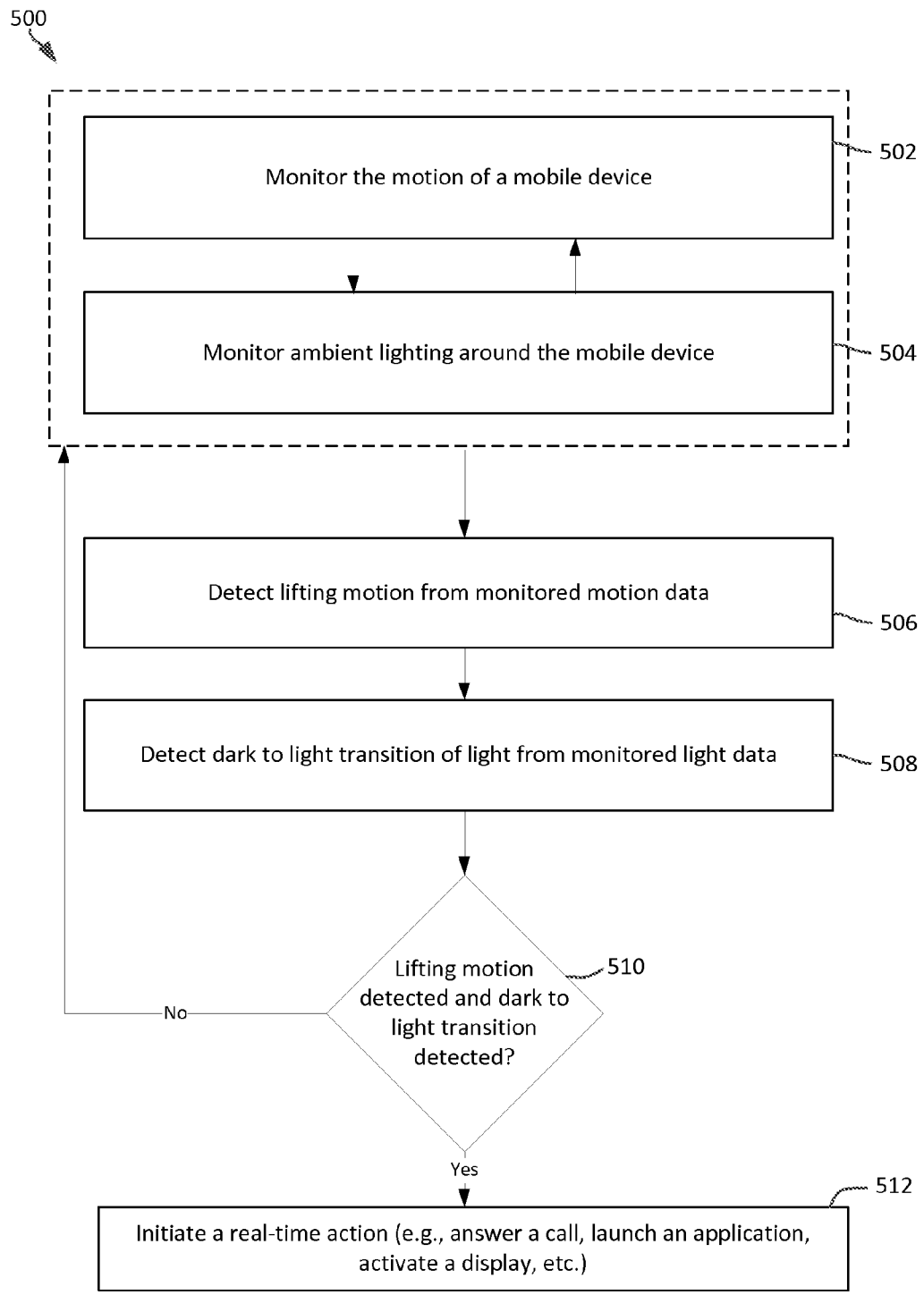
FIG. 5 is a flowchart of a process for detecting and responding to the removal of a mobile device from storage, shown according to an exemplary embodiment.

Referring to FIG. 5, a flow diagram of a process 500 for detecting and responding to a removal of a device from storage is shown, according to an exemplary embodiment. In alternative embodiments, fewer, additional, and/or different steps may be performed. Also, the use of a flow diagram is not meant to be limiting with respect to the order of steps performed. Process 500 includes monitoring the motion of a mobile device (step 502), monitoring ambient lighting around the mobile device (step 504), detecting a lifting motion from the monitored motion data (step 506), and detecting a dark to light transition of light from the monitored light data (step 508). If an appropriate lifting motion is detected and an appropriate dark to light transition is detected (step 510), then a real-time action is initiated (e.g., answer a call, launch an application, activate a display, etc.) (step 512).

Figure 6:
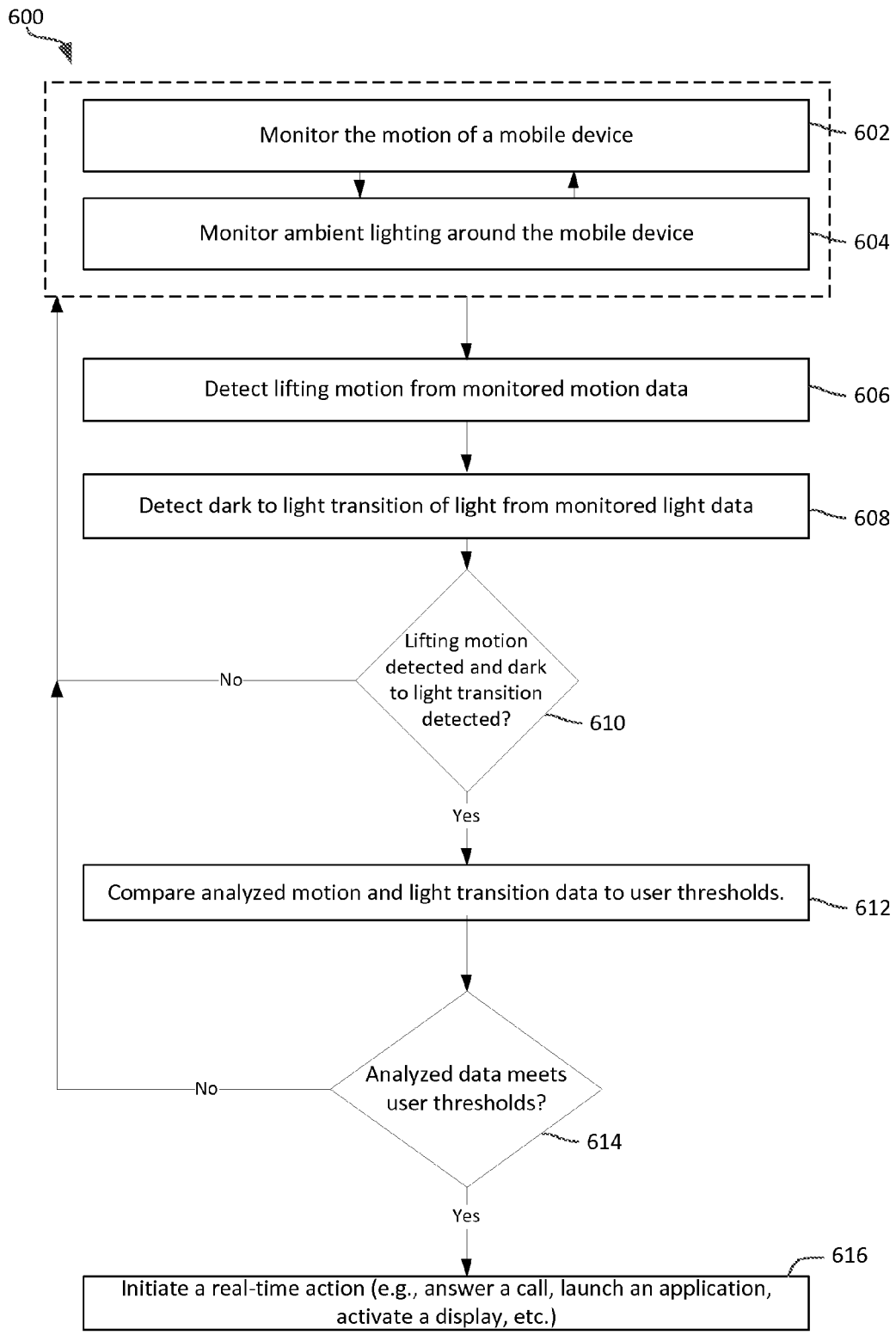
FIG. 6 is a flowchart of a process for detecting and responding to the removal of a mobile device from storage, shown according to an exemplary embodiment.

Referring to FIG. 6, a flow diagram of a process 600 for detecting and responding to a removal of a device from storage is shown, according to an exemplary embodiment. In alternative embodiments, fewer, additional, and/or different steps may be performed. Also, the use of a flow diagram is not meant to be limiting with respect to the order of steps performed. Process 600 includes monitoring the motion of a mobile device (step 602), monitoring ambient lighting around the mobile device (step 604), detecting a lifting motion from the monitored motion data (step 606), and detecting a dark to light transition of light from the monitored light data (step 608). If a lifting motion is detected and a dark to light transition is detected (step 610), then the analyzed motion data and light transition data are compared to user thresholds. If the analyzed data meets user thresholds (step 614), then a real-time action is initiated (e.g., answer a call, launch an application, activate a display, etc.) (step 616).

Figure 7:
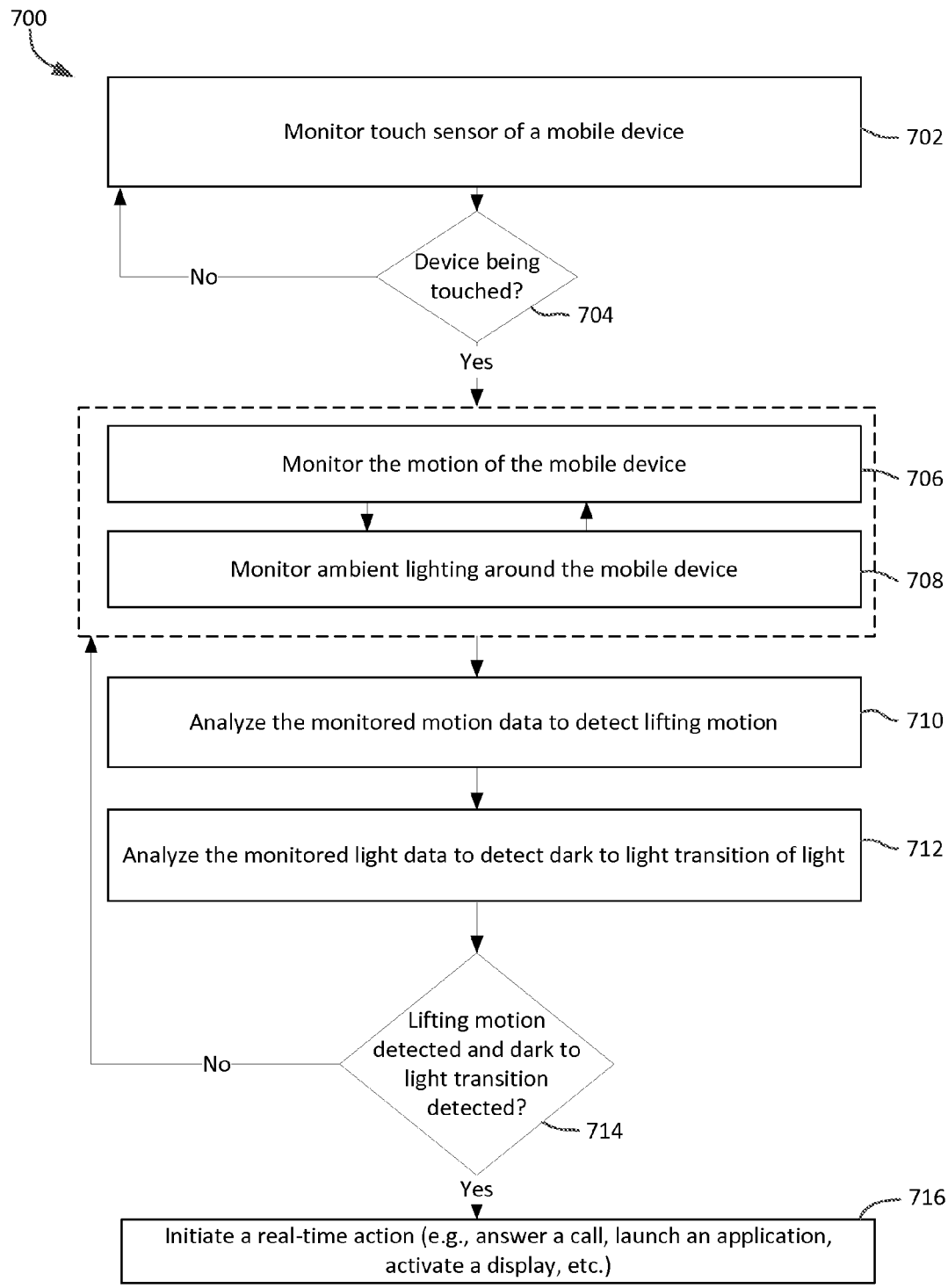
FIG. 7 is a flowchart of a process for detecting and responding to the removal of a mobile device from storage, shown according to an exemplary embodiment.

Referring to FIG. 7, a flow diagram of a process 700 for detecting and responding to a removal of a device from storage is shown, according to an exemplary embodiment. In alternative embodiments, fewer, additional, and/or different steps may be performed. Also, the use of a flow diagram is not meant to be limiting with respect to the order of steps performed. Process 700 includes monitoring a touch sensor of a mobile device (step 702). If the mobile device is being touched (step 704), then monitor the motion of the mobile device (step 706), monitor ambient lighting around the mobile device (step 708), analyze the monitored motion data to detect a lifting motion (step 710), and analyze the monitored light data to detect dark to light transitions of light (step 712). If an appropriate lifting motion is detected and an appropriate dark to light transition is detected (step 714), then a real-time action is initiated (e.g., answer a call, launch an application, activate a display, etc.) (step 716).

Figure 8:
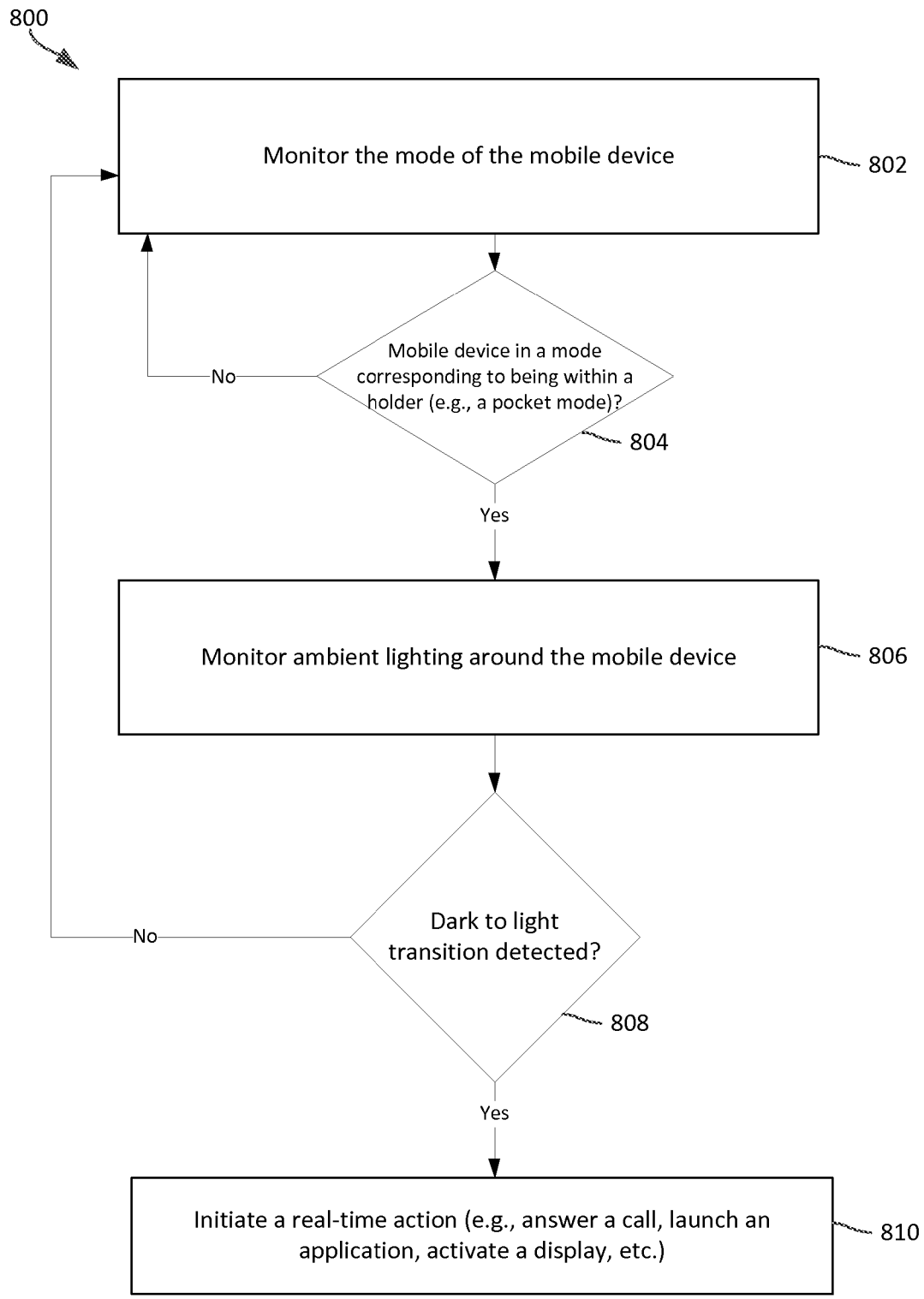
FIG. 8 is a flowchart of a process for detecting and responding to the removal of a mobile device from storage, shown according to an exemplary embodiment.

Referring to FIG. 8, a flow diagram of a process 800 for detecting and responding to a removal of a device from storage is shown, according to an exemplary embodiment. In alternative embodiments, fewer, additional, and/or different steps may be performed. Also, the use of a flow diagram is not meant to be limiting with respect to the order of steps performed. Process 800 includes monitoring the mode of the mobile device (step 802). If the mobile device is in a mode corresponding to being within a holder (e.g., a pocket mode or equivalent, a standby mode, etc.) (step 804), then monitor the ambient lighting around the mobile device (step 806). If an appropriate dark to light transition is detected (step 808) while the mobile device is in a storage mode, then a real-time action is initiated (e.g., answer a call, launch an application, activate a display, etc.) (step 810).

For purposes of this disclosure, the term "coupled" means the joining of two members directly or indirectly to one another. Such joining may be stationary in nature or moveable in nature and such joining may allow for the flow of electricity, electrical signals, or other types of signals or communication between the two members. Such joining may be achieved with the two members or the two members and any additional intermediate members being integrally formed as a single unitary body with one another or with the two members or the two members and any additional intermediate members being attached to one another. Such joining may be permanent in nature or alternatively may be removable or releasable in nature.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

Although the figures may show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A mobile device, comprising:
   a motion sensor configured to acquire motion data;
   a light sensor configured to detect an ambient light level and generate light data; and
   a processing circuit configured to:
   determine displacement data corresponding to a vertically upwards displacement of the entire mobile device based on the motion data;
   detect a light transition from dark to light based on the light data; and
   determine whether to initiate an action based on the displacement data and the light transition, wherein the action is initiated based on at least one of the displacement and the light transition exceeding a threshold, the threshold specified by a user input;
   wherein the action is initiated based on both the displacement and the light transition exceeding the threshold during a first time of day, and wherein the action is initiated based on the displacement exceeding the threshold and the light transition not exceeding the threshold during a second time of day.

2. The mobile device of claim 1, wherein the action is based on configuration data, the action comprising activating a display screen of the mobile device, the activating causing the display screen to turn on from at least one of an off state or a sleep state.

3. The mobile device of claim 2, wherein the user input is a first user input, and wherein the configuration data is adjusted according to a second user input.

4. The mobile device of claim 1, wherein the threshold includes a minimum or maximum displacement requirement.

5. The mobile device of claim 1, wherein the threshold includes a minimum upwards vertical motion requirement.

6. The mobile device of claim 1, wherein the threshold includes a minimum or maximum level of light requirement.

7. The mobile device of claim 1, wherein the threshold includes a ratio of light levels across a dark to light transition.

8. The mobile device of claim 1, wherein the threshold includes an amount of vertical displacement within a specified time interval.

9. The mobile device of claim 1, wherein the threshold is based on at least one external condition.

10. The mobile device of claim 9, wherein the at least one external condition includes at least one of a time and a date.

* * * * *